United States Patent
Lee

(10) Patent No.: US 9,310,484 B2
(45) Date of Patent: Apr. 12, 2016

(54) DEVICE FOR DETECTING A MOVING OBJECT

(75) Inventor: Wei-Chia Lee, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1908 days.

(21) Appl. No.: 12/227,764

(22) PCT Filed: Jun. 28, 2007

(86) PCT No.: PCT/EP2007/056474
§ 371 (c)(1),
(2), (4) Date: Apr. 24, 2009

(87) PCT Pub. No.: WO2008/017542
PCT Pub. Date: Feb. 14, 2008

(65) Prior Publication Data
US 2009/0210157 A1    Aug. 20, 2009

(30) Foreign Application Priority Data
Aug. 11, 2006  (DE) .................... 10 2006 037 591

(51) Int. Cl.
| G06F 17/00 | (2006.01) |
| G01S 15/87 | (2006.01) |
| G01S 15/93 | (2006.01) |
| G01S 7/00  | (2006.01) |

(52) U.S. Cl.
CPC ............ *G01S 15/87* (2013.01); *G01S 15/931* (2013.01); *G01S 7/003* (2013.01)

(58) Field of Classification Search
CPC ........... G01S 13/931; G08G 1/16; B60T 7/22; B60W 30/09; B60R 21/0314
USPC ..................................... 701/301; 340/932.2
See application file for complete search history.

(56) References Cited

U.S. PATENT DOCUMENTS

| 5,092,607 | A  | * | 3/1992  | Ramsay et al. ............... 273/372 |
| 6,233,462 | B1 | * | 5/2001  | Kanai ............................ 455/567 |
| 6,400,308 | B1 |   | 6/2002  | Bell et al. |
| 7,114,554 | B2 | * | 10/2006 | Bergman et al. .............. 165/238 |
| 7,138,938 | B1 | * | 11/2006 | Prakah-Asante et al. ....... 342/70 |
| 7,289,018 | B2 |   | 10/2007 | Ewerhart et al. |
| 7,363,140 | B2 |   | 4/2008  | Ewerhart et al. |
| 2003/0058132 | A1 | * | 3/2003 | Maier et al. ................. 340/932.2 |

(Continued)

FOREIGN PATENT DOCUMENTS

| DE | 3500152 | 7/1986 |
| DE | 4005444 | 8/1991 |

(Continued)

OTHER PUBLICATIONS

International Search Report, PCT International Patent Application No. PCT/EP2007/056474, dated Oct. 30, 2007.

*Primary Examiner* — Helal A Algahaim
*Assistant Examiner* — Shardul Patel
(74) *Attorney, Agent, or Firm* — Kenyon & Kenyon LLP

(57) ABSTRACT

A device having at least one ultrasonic sensor for detecting a moving object, in particular, an approaching vehicle. To this end, the device is equipped with a control unit for determining the distance and/or the relative speed of the object. To prevent misinterpretations in the acquisition of measured values, relevant environmental conditions are simultaneously detected by an additional ultrasonic sensor and, as a correction value, provide the basis for the signal generation.

10 Claims, 1 Drawing Sheet

(56) References Cited

U.S. PATENT DOCUMENTS

| | | | |
|---|---|---|---|
| 2005/0033516 A1* | 2/2005 | Kawasaki | 701/301 |
| 2005/0168331 A1* | 8/2005 | Gunderson | 340/468 |

FOREIGN PATENT DOCUMENTS

| | | |
|---|---|---|
| DE | 4120397 | 12/1992 |
| DE | 4313568 | 6/1994 |
| DE | 19526452 | 10/1996 |
| DE | 29620357 | 3/1997 |
| DE | 19843395 | 3/2000 |
| DE | 10323639 | 12/2004 |
| EP | 0443185 * | 2/1990 |
| EP | 0443185 | 8/1991 |
| EP | 1612082 A1 * | 6/2004 |
| EP | 1571638 | 9/2005 |
| EP | 1607264 | 12/2005 |
| EP | 1612082 | 1/2006 |
| JP | 8-43523 | 2/1996 |
| JP | 2002-131417 | 5/2002 |

* cited by examiner

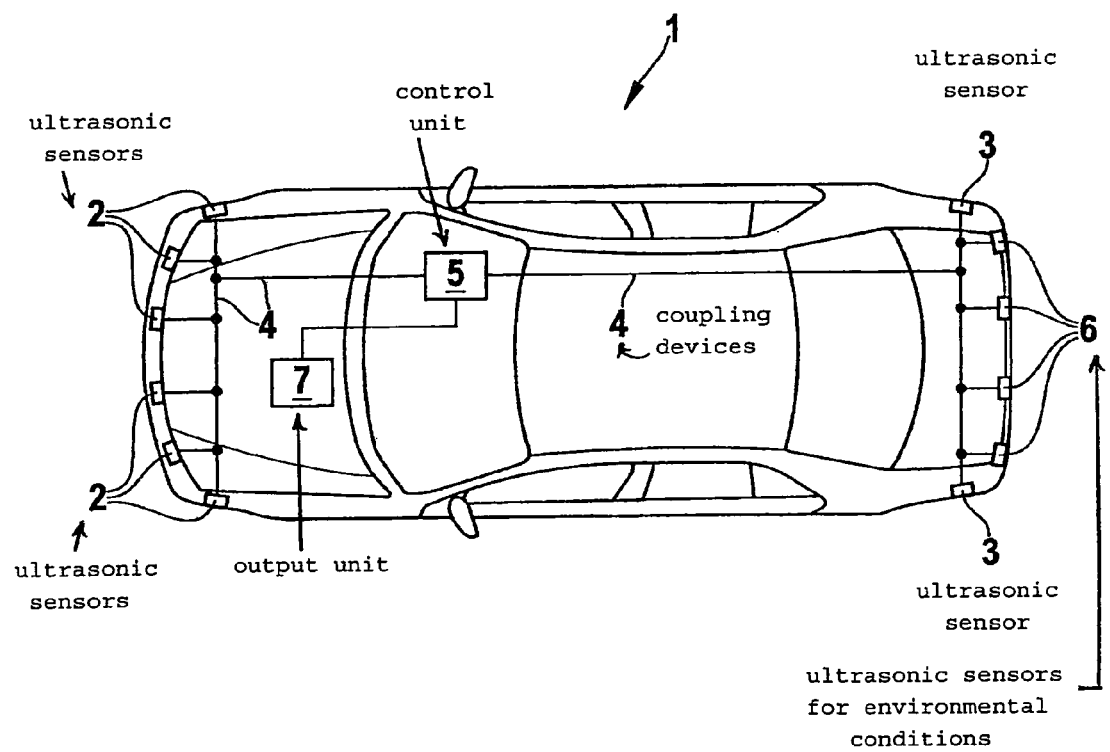

DEVICE FOR DETECTING A MOVING OBJECT

FIELD OF THE INVENTION

The present invention relates to a device having at least one ultrasonic sensor for detecting a moving object, in particular, an approaching vehicle, and having a control unit for determining on the one hand the distance and/or the relative speed of the object as a measured value, and on the other hand the environmental conditions relevant with regard to acquiring the measured value, as well as having an output unit for releasing a signal as needed on the basis of the measured values ascertained in this manner.

BACKGROUND INFORMATION

A device of the above-mentioned type intended for motor vehicles is known as a "lane-changing assistant." The lane-changing assistant is a device for determining a risk value with the aid of locating data, in particular the distance and the relative speed of the vehicles affected by the lane change.

Lane-changing procedures involve a high risk of accident in particular on expressways and multilane freeways. The usual cause of this is that a vehicle driver who is changing lanes overlooks or incorrectly estimates the distance and/or speed of other road users who are approaching from behind in the adjacent lane or who are located in the blind spot.

A lane-changing assistant supports the driver when changing lanes, for example, during passing maneuvers and swinging-in maneuvers. Accordingly, one function of the lane-changing assistant is to inform the driver about vehicles or to warn him about vehicles that are approaching rapidly from behind or that are located in the blindspot. This helps considerably to prevent collision accidents.

The lane-changing assistant includes at least one locator, for example, a radar, lidar, or ultrasonic sensor, which monitors the rear region next to and behind the host vehicle and provides information about the vehicles affected by the lane change. The affected vehicles are in particular vehicles in the blindspot, as well as subsequent vehicles in the adjacent lane, at least the immediately subsequent vehicle.

Preferably, vehicles that are located at approximately the same level as the host vehicle and are thus not situated in the blind spot but may still be easily overlooked by the driver are also taken into account. At least with regard to subsequent vehicles, the distances of these vehicles and their time derivatives are the relevant locating data. The distance and the relative speed of the immediately subsequent vehicle are particularly relevant.

The risk value, which specifies the potential risk of a collision, is determined with the aid of the locating data. In this process, the absolute speed of the host vehicle is generally also to be taken into account, since a larger safety distance is to be maintained at higher speeds.

When the driver indicates the intention to change lanes, for example, by activating the blinker or by a steering maneuver, the lane-changing assistant generates a warning signal as a function of the ascertained risk value, in the form of an acoustic signal or in the form of an optical display on the dashboard or in the left outside mirror, for example.

If the risk value is multivalent, the warning signal is output at that moment when the risk value exceeds a particular threshold value, for example; or the warning signal specifies the risk value directly by varying the volume of the acoustic signal or in the form of a bar display, for example. Alternatively, the risk value may also be used for the purpose of enabling the lane-changing assistant to actively propose a lane change by outputting a prompt signal or, implicitly, by initiating an acceleration procedure with which preparations are made for slipping into the traffic in the adjacent lane, for example. The lane-change prompt may then also be a function of other criteria in addition to the risk value.

Furthermore, a lane-changing assistant is described in European Patent No. EP 16 12 082 A1, which, in addition to determining the movement data of the motor vehicle, also considers the environmental conditions as environmental influences that may have a favorable or an unfavorable effect on the possibilities and capabilities of other road users to react appropriately to the lane change.

In particular, relevant environmental influences are those that relate to visibility conditions and the road condition, for example, fog. The lane-changing assistant makes it possible in particular to take into account that under such conditions, the driver of the subsequent vehicle requires a larger safety distance. A large safety distance is likewise to be maintained with regard to the subsequent vehicle in the event of an unfavorable road condition, for example, a wet road surface due to rain, or slippery ice.

A detector having one or more sensors, for example, an ambient light sensor, a rain detector as is available for controlling the windshield wiper, for example, and the like, is provided for detecting the environmental conditions. Likewise, special sensors or detection systems for slippery ice and/or for fog are possible.

However, in practice, lane-changing assistants that are developed in this manner have the disadvantage that the environmental conditions determined by the detector in this manner do not always allow for an error-free inference regarding the environment. Thus, for example, the windshield may be moistened due to a cleaning of the vehicle or by a preceding vehicle such that the rain sensor indeed appropriately activates the windshield wiper function; however, the conclusion that the roadway is also wet is not accurate.

German Patent Application No. DE 103 23 639 A1 describes a method for detecting a stationary object while adaptively adjusting the detection properties of a detector. For example, ultrasonic or radar sensors are used for this purpose. In the event of stochastically occurring detection signals, such as interference signals triggered by the ground echo of gravel, for example, the detection parameters, such as the sensitivity parameters of the detector, are adjusted until these are no longer detected.

Furthermore, German Patent Application No. DE 41 20 397 A1 describes very generally a device for contact-free distance measuring, in particular for motor vehicles. The device is equipped with two ultrasonic sensors for measuring the echo time of an ultrasonic signal reflected by an object. This is used to calculate the distance to the object, the echo time of the signal between the two sensors that are disposed at a predefined distance additionally being used as a correction value.

Examples of lane-changing assistants and the associated sensor systems are described in German Patent Application Nos. DE 40 05 444 A1, DE 35 00 152 A1, DE 296 20 357 U1, DE 43 13 568 C1, DE 195 26 452 C1, U.S. Pat. No. 6,400,308 B1.

SUMMARY

An object of the present invention is to provide a device of the mentioned type such that undesired error influences are virtually ruled out. In particular, the environmental conditions shall be detected reliably.

According to the present invention, this object may be achieved by at least one additional ultrasonic sensor for determining the environmental conditions while the other ultrasonic sensor determines the distance or the relative speed of the moving object.

According to the present invention, the additional ultrasonic sensor may be used to simultaneously determine the environmental conditions, and thus to measure them largely without error influences. In this context, the additional ultrasonic sensor is used in particular to continuously monitor environmental conditions, so that very short reaction times may be ensured. It is thus no longer necessary to synthesize the information from information acquired in other ways, i.e., temperature information, or information from a windshield wiper control system or a rain sensor, so that corresponding error influences or misinterpretations are ruled out. Of course, the possibility of simultaneously providing the measured values acquired by the additional ultrasonic sensor to additional functionalities, for example, for a parking pilot, is not ruled out.

A particularly advantageous specific embodiment of the present invention is achieved, for example, by implementing the device or the additional ultrasonic sensor as an integral component of a motor vehicle or of a structural element of the motor vehicle. This significantly simplifies the manufacturing of a motor vehicle equipped in this manner, and at the same time improves the operational reliability. At the same time, a modular construction is also able to be implemented without problems, in that an already existing sensor may be used as the additional ultrasonic sensor, for example.

In addition, it proves particularly practical if the additional ultrasonic sensor is designed as a component of an existing ultrasonic measuring device, in particular as a component of an electronic parking assistance, and is consequently completely available to detect environmental conditions during the drive, so that an overlap with the functionality of the parking assistance is not to be feared. In addition, it is also possible to refrain from detecting environmental conditions during the comparatively brief amount of time during which the parking assistance is used.

The environmental conditions detected by the additional ultrasonic sensor could be converted by the control unit into a signal for the driver, to provide the driver with an aid for interpreting the measured values concerning the approaching vehicle. On the other hand, it is particularly advantageous if the control unit is able to automatically adjust a threshold value for releasing the signal on the basis of the detected environmental conditions. This prevents an erroneous evaluation of the acquired distance measurement values or relative speed measurement values of the moving object and thus improves the operational reliability in a simple way. In particular, the threshold value, as a sensitivity, is thus modified in accordance with detected environmental conditions, stepwise or steplessly, until the measured values still acquired fulfill predefined criteria with regard to a plausibility check.

Furthermore, it proves particularly effective for the device to have an input unit for manually modifying the threshold value adjusted by the control unit, in order thus to allow the signal generation to be adjusted to the individual requirements of the driver. For example, various threshold values may additionally be selectable, which also allows a preselection according to individual driving experience, in particular for learners.

In this context, it is likewise advantageous if predefined sensor parameters of the ultrasonic sensor are able to be selected from a memory unit of the control unit on the basis of the detected environmental conditions, in order thus to be able to use the predefined sensor parameters quasi as correction values that are classified as sensible or practical for the respective environmental conditions based on empirical values.

According to an additional, particularly promising design of the present invention, the sensitivity of the ultrasonic sensor is able to be adjusted to this end on the basis of the detected environmental conditions, so that undesired signals are not acquired, and so the adjustment to the environmental conditions takes place independently of the signal processing in a simple manner.

Another particularly practical development of the present invention is achieved in that the ultrasonic sensor has a detecting range that extends laterally and/or behind the motor vehicle. The rear ultrasonic sensor is located in the back of the vehicle with a direction of view of 45° towards the back. The front sensor is directed towards the side. The rear sensor detects objects in the blind spot. The front sensor plausibilizes, over time and travel distance, objects like guardrails and the oncoming traffic, and in this way suppresses a warning signal.

Accordingly, depending on the intended purpose, means for generating an optical and/or acoustic warning signal serve on the one hand to attract the attention of the driver, and on the other hand to prevent a distraction from the traffic, which could result in an overall decrease in driving safety.

In this context, the term environmental conditions is to include the temperature, the moisture, or also rain, for example, which respectively have different influences on the ultrasonic sensors. So, for example, the attenuation of the amplitude (strength) of a sound impulse is a function of temperature and moisture. By evaluating and comparing the reflected echo of the ground, it is possible to estimate the prevailing attenuation and to deduce the temperature-moisture ratio.

In addition to attenuating the amplitude, rain also has the effect that, due to the wet road, the increased rolling noise is superposed on the ground noise. Thus, the entire noise level appears to be higher for the sensor.

Such influence factors and detected concomitant circumstances may usefully enter into the signal preparation.

The other ultrasonic sensors may be switched into a "passive mode" when the environmental noise is being estimated. The ultrasonic sensors do not send sound waves in this mode; thus, only external noise from the environment is detected. A time-dependent threshold value makes the point in time at which the threshold value is exceeded proportional to the noise amplitude. This may be accomplished, for example, by the front, lateral sensors of a blind-spot monitoring system. For these are always active for interpreting the situation in monitoring the blind spot. These sensors are operated in the passive mode for several cycles when the noise amplitude is being estimated.

BRIEF DESCRIPTION OF THE DRAWING

An exemplary embodiment of the present invention is illustrated schematically in the FIGURE and described in more detail below.

The FIGURE shows a top view of a motor vehicle in order to explain the mode of operation of the device according to an example embodiment of the present invention.

DETAILED DESCRIPTION OF EXAMPLE EMBODIMENTS

The FIGURE shows a motor vehicle 1 that is equipped with a device according to the present invention for detecting an approaching vehicle that is not shown. The device has multiple ultrasonic sensors 2, 3 that are disposed in the front region and the rear region and are connected via coupling devices 4 to a control unit 5 for determining the distance and the relative speed of the approaching vehicle. Furthermore, the device is connected to multiple additional ultrasonic sensors 6, which are associated with a parking assistance system, for determining the environmental conditions, which thereby allows for the latter to be detected at the same time that the distance and the relative speed of the approaching vehicle is being determined via the other ultrasonic sensors 2, 3. In this way, it is possible to base the warning signal for the vehicle operator, which is able to be released by an output unit 7 as needed, on the detected, relevant environmental conditions as a correction value, in order to avoid erroneous signals in this manner.

What is claimed is:

1. A device comprising: at least one first ultrasonic sensor to detect a moving object; a control unit adapted to determine, on the one hand, at least one of a distance and a relative speed of the moving object as a measured value, and, on the other hand, environmental conditions relevant with regard to acquiring the measured value, wherein the environmental conditions include at least one of visibility conditions, road conditions, temperature information, and rain information; an output unit adapted to release a signal as needed based on the measured value; and at least one additional ultrasonic sensor adapted to substantially simultaneously determine the environmental conditions while the first ultrasonic sensor determines the at least one of the distance and the relative speed of the moving object.

2. The device as recited in claim 1, wherein at least one of the device and the additional ultrasonic sensor is embodied as one of an integral component of a motor vehicle or of an element of the motor vehicle.

3. The device as recited in claim 1, wherein the additional ultrasonic sensor is embodied as a component of an existing ultrasonic measuring device, the existing ultrasonic measuring device being an electronic parking assistance.

4. The device as recited in claim 1, wherein a threshold value for releasing the signal based on the detected environmental conditions is able to be automatically adjusted by the control unit.

5. The device as recited in claim 4, further comprising: an input unit for manually changing the threshold value set by the control unit.

6. The device as recited in claim 1, wherein predetermined sensor parameters of the first ultrasonic sensor are able to be selected from a memory unit of the control unit based on the detected environmental conditions.

7. The device as recited in claim 1, wherein a sensitivity of the first ultrasonic sensor is adjustable based on the detected environmental conditions.

8. The device as recited in claim 2, wherein the first ultrasonic sensor has a detecting range that extends at least one of laterally, and behind the motor vehicle.

9. The device as recited in claim 1, further comprising: an arrangement adapted to generate at least one of an optical and acoustic warning signal.

10. The device as recited in claim 1, wherein the device is designed to detect a moving object.

* * * * *